US011623527B2

(12) United States Patent
Ramanujam et al.

(10) Patent No.: US 11,623,527 B2
(45) Date of Patent: Apr. 11, 2023

(54) ELECTRIC VEHICLE BASED MICRO GRID IDENTIFICATION FOR ON-DEMAND POWER SUPPLY

(71) Applicant: Tata Consultancy Services Limited, Mumbai (IN)

(72) Inventors: Arvind Ramanujam, Chennai (IN); Pandeeswari Indumathi Sankaranarayanan, Chennai (IN); Arunchandar Vasan, Chennai (IN); Rajesh Jayaprakash, Chennai (IN); Venkatesh Sarangan, Chennai (IN); Anand Sivasubramaniam, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 139 days.

(21) Appl. No.: 16/020,672

(22) Filed: Jun. 27, 2018

(65) Prior Publication Data

US 2019/0143829 A1   May 16, 2019

(30) Foreign Application Priority Data

Nov. 14, 2017   (IN) .............................. 201721040656

(51) Int. Cl.
*B60L 3/12* (2006.01)
*B60L 55/00* (2019.01)
*B60L 58/12* (2019.01)

(52) U.S. Cl.
CPC ................ *B60L 3/12* (2013.01); *B60L 55/00* (2019.02); *B60L 58/12* (2019.02); *B60L 2240/70* (2013.01)

(58) Field of Classification Search
CPC .. B60L 3/12; B60L 53/60; B60L 53/62; B60L 53/63; B60L 53/64; B60L 53/65;
(Continued)

(56) References Cited

U.S. PATENT DOCUMENTS 7,323,848 B2 * 1/2008 Fujihara ............... G01R 31/367
320/132
8,509,976 B2   8/2013 Kempton
(Continued)

FOREIGN PATENT DOCUMENTS

KR        20160007315         *  1/2016
WO     WO-2014192615 A1  * 12/2014 ............. B60L 53/32

*Primary Examiner* — Jeffrey C Boomer
(74) *Attorney, Agent, or Firm* — Finnegan, Henderson, Farabow, Garrett & Dunner LLP (57) ABSTRACT

Vehicle-to-Grid (V2G) technologies are being adopted to reduce peak demand and to take over as energy sources during grid instability. It is necessary to estimate attributes of electric vehicle trips and residual battery charge in order to correctly predict spatio-temporal availability of energy from EVs to form a micro grid. However, it may not be feasible to get the required attributes for all vehicles in a city-scale traffic scenario. Embodiments of the present disclosure and system address the problem of accurately estimating the local energy reserve that is available from parked EVs during a given time of the day. In addition, the system also determines which neighborhoods have the potential to form micro grids using the parked EVs during a given time period. This will help grid operator(s) to plan and design smart grids which can create EV-powered micro grids in neighborhoods during periods of peak demand or during disruptions.

16 Claims, 6 Drawing Sheets

(58) Field of Classification Search
CPC .......... B60L 53/66; B60L 53/67; B60L 53/68; B60L 55/00; B60L 58/12; B60L 2240/70; B60L 58/30; B60L 58/40; H02J 3/14; Y02E 60/00; Y02B 70/3225; Y04S 20/222; Y04S 10/126; Y02T 90/12; Y02T 10/70; Y02T 10/7072; Y02T 90/16; Y02T 10/72

See application file for complete search history.

(56) References Cited

U.S. PATENT DOCUMENTS

| | | |
|---|---|---|
| 8,700,225 B2 | 4/2014 | Pratt et al. |
| 9,026,347 B2 | 5/2015 | Gadh et al. |
| 9,153,966 B2 | 10/2015 | Ishida |
| 2014/0107852 A1* | 4/2014 | Horsfield ............... H02J 3/14 700/295 |
| 2015/0039391 A1* | 2/2015 | Hershkovitz ........... B60L 53/65 705/7.31 |
| 2016/0280089 A1* | 9/2016 | Uyeki ................ B60L 11/1842 |
| 2017/0136911 A1* | 5/2017 | Ricci ..................... B60L 53/126 |

\* cited by examiner

ELECTRIC VEHICLE BASED MICRO GRID IDENTIFICATION FOR ON-DEMAND POWER SUPPLY

PRIORITY CLAIM

This U.S. patent application claims priority under 35 U.S.C. § 119 to: India Application No. 201721040656, filed on Nov. 14, 2017. The entire contents of the aforementioned application are incorporated herein by reference.

TECHNICAL FIELD

The disclosure herein generally relate to electric vehicles, and, more particularly, to electric vehicle (EV) based micro grid identification for on-demand power supply.

BACKGROUND

Electric utilities have started supporting micro grids which help in improving grid resilience and in reducing peak congestion. Vehicle-to-Grid (V2G) technologies are being adopted to reduce peak demand and to take over as energy sources during times of grid instability. The energy reserves from electrical vehicles (EVs) for a given time of day and location is influenced by the nature of the trips undertaken by the EVs and the residual charge left in the battery at the time of parking. It is necessary to accurately estimate the attributes (trip start/end locations, velocity/acceleration values during a trip, and the like) of the EV trips and the residual battery charge in order to correctly predict the spatio-temporal availability of energy from EVs to form a micro grid. However, it may not be feasible to get the required attributes for all vehicles in a city-scale traffic scenario.

SUMMARY

Embodiments of the present disclosure present technological improvements as solutions to one or more of the above-mentioned technical problems recognized by the inventors in conventional systems. For example, in one aspect, a processor implemented method for electric vehicle based micro grid identification for on-demand power supply is provided. The processor implemented method, comprising: partitioning, via one or more processors, a region of interest (ROI) into one or more cells; determining a base load of each of the one or more cells based on one or more utilities that serve each of the one or more cells; obtaining by a calibrated traffic micro-simulator, trip information pertaining to one or more vehicles from one or more demographic data; extracting one or more values from the trip information for each of the one or more vehicles, wherein the one or more values correspond to at least one of speed, acceleration, and a state of battery associated with the one or more vehicles; mapping from the obtained trip information and the one or more values, one or more origins and destinations of one or more locations to the one or more cells to obtain mapped data, and determining one or more time intervals pertaining to each vehicle being parked and associated charge level of the battery based on the mapped data, wherein each of the one or more origins and destinations of the one or more locations is mapped to a corresponding cell in which each vehicle is located; modeling a state of charge (SoC) of the battery of each vehicle based on at least one of one or more charging states, one or more discharging states, and one or more vehicle to grid (v2g) discharging scenarios; configuring for each vehicle, one or more v2g policy variables, wherein the one or more v2g policy variables may comprise: at least one of an amount of energy to be supplied by a vehicle based on a battery energy threshold, an amount of power a vehicle is capable of supplying, time at which a vehicle is capable of supplying power when the vehicle is in the one or more cells; computing based on the configured one or more v2g policy variables, a v2g power that is capable of being supplied by each vehicle being parked in a corresponding cell to obtain a v2g power supply; performing a comparison of (i) the v2g power supply being supplied by one or more vehicles in the one or more cells and (ii) the base load; and identifying at least one potential cell from the one or more cells as a micro grid based on the comparison, wherein the at least one identified potential cell comprises a plurality of vehicles. In an embodiment, the at least one cell is identified as the micro grid when the v2g power supply is greater than the base load.

In an embodiment, the method may further comprise updating a state of charge (SoC) of the battery of each vehicle that has contributed the v2g power. In an embodiment, the method may further comprise determining at least a subset of the one or more vehicles as one or more eligible vehicles to be part of a v2g pool, wherein based on the determined at least a subset, the method further comprises determining for each of the one or more eligible vehicles, a time period, wherein the time period indicates amount of time and a time interval (start time and end time) that each eligible vehicle is capable of being a part of the v2g pool. In an embodiment, based on the determined time period, determining an amount of energy each of the eligible vehicle is capable of supplying.

In an embodiment, the method may further comprise identifying for a given time period, at least a subset from the one or more cells as one of a sustainable resource or a non-sustainable resource.

In another aspect, a system electric vehicle based micro grid identification for on-demand power supply is provided. The system comprising: a memory storing instructions; one or more communication interfaces; and one or more hardware processors coupled to the memory via the one or more communication interfaces, wherein the one or more hardware processors are configured by the instructions to: partition a region of interest (ROI) into one or more cells; determine a base load of each of the one or more cells based on one or more utilities that serve each of the one or more cells; obtain via a calibrated traffic micro-simulator, trip information pertaining to one or more vehicles from one or more demographic data; extract one or more values from the trip information for each of the one or more vehicles, wherein the one or more values correspond to at least one of speed, acceleration, and a state of battery associated with the one or more vehicles; map from the obtained trip information and the one or more values, one or more origins and destinations of one or more locations to the one or more cells to obtain mapped data, and determining one or more time intervals pertaining to each vehicle being parked and associated charge level of the battery based on the mapped data, wherein each of the one or more origins and destinations of the one or more locations is mapped to a corresponding cell in which each vehicle is located; model a state of charge (SoC) of the battery of each vehicle based on at least one of one or more charging states, one or more discharging states, and one or more vehicle to grid (v2g) discharging scenarios; configure for each vehicle, one or more v2g policy variables; compute based on the configured one or more v2g policy variables, wherein the one or more v2g policy variables comprise: at least one of an amount of energy to be supplied by a vehicle based on a battery energy threshold, an amount of power a vehicle is capable of supplying, time at which a vehicle is capable of supplying power when the vehicle is in the one or more cells, a v2g power that is capable of being supplied by each vehicle being parked in a corresponding cell to obtain a v2g power supply; perform a comparison of (i) the v2g power supply being supplied by one or more vehicles in the one or more cells and (ii) the base load; and identify at least one potential cell from the one or more cells as a micro grid based on the comparison, wherein the at least one identified potential cell comprises a plurality of vehicles. In an embodiment, the at least one cell is identified as the micro grid when the v2g power supply is greater than the base load.

In an embodiment, the one or more hardware processors may be further configured by instructions to update a state of charge (SoC) of the battery of each vehicle that has contributed the v2g power. In an embodiment, the one or more hardware processors may be further configured by instructions to determine at least a subset of the one or more vehicles as one or more eligible vehicles to be part of a v2g pool.

In an embodiment, based on the determined at least a subset, the one or more hardware processors may be further configured by instructions to determine, for each of the one or more eligible vehicles, a time period, wherein the time period indicates amount of time and a time interval that each eligible vehicle is capable of being a part of the v2g pool. In an embodiment, based on the determined time period, the one or more hardware processors may be further configured by instructions to determine an amount of energy each of the eligible vehicle is capable of supplying. In an embodiment, the one or more hardware processors are further configured by instructions to identify for a given time period, at least a subset from the one or more cells as one of a sustainable resource or a non-sustainable resource.

In yet another aspect, one or more non-transitory machine readable information storage mediums comprising one or more instructions is provided. The one or more instructions which when executed by one or more hardware processors electric vehicle based micro grid identification for on-demand power supply by: partitioning, via the one or more processors, a region of interest (ROI) into one or more cells; determining a base load of each of the one or more cells based on one or more utilities that serve each of the one or more cells; obtaining by a calibrated traffic micro-simulator, trip information pertaining to one or more vehicles from one or more demographic data; extracting one or more values from the trip information for each of the one or more vehicles, wherein the one or more values correspond to at least one of speed, acceleration, and a state of battery associated with the one or more vehicles; mapping from the obtained trip information and the one or more values, one or more origins and destinations of one or more locations to the one or more cells to obtain mapped data, and determining one or more time intervals pertaining to each vehicle being parked and associated charge level of the battery based on the mapped data, wherein each of the one or more origins and destinations of the one or more locations is mapped to a corresponding cell in which each vehicle is located; modeling a state of charge (SoC) of the battery of each vehicle based on at least one of one or more charging states, one or more discharging states, and one or more vehicle to grid (v2g) discharging scenarios; configuring for each vehicle, one or more v2g policy variables, wherein the one or more v2g policy variables may comprise: at least one of an amount of energy to be supplied by a vehicle based on a battery energy threshold, an amount of power a vehicle is capable of supplying, time at which a vehicle is capable of supplying power when the vehicle is in the one or more cells; computing based on the configured one or more v2g policy variables, a v2g power that is capable of being supplied by each vehicle being parked in a corresponding cell to obtain a v2g power supply; performing a comparison of (i) the v2g power supply being supplied by one or more vehicles in the one or more cells and (ii) the base load; and identifying at least one potential cell from the one or more cells as a micro grid based on the comparison, wherein the at least one identified potential cell comprises a plurality of vehicles. In an embodiment, the at least one cell is identified as the micro grid when the v2g power supply is greater than the base load.

In an embodiment, the instructions may further cause updating a state of charge (SoC) of the battery of each vehicle that has contributed the v2g power. In an embodiment, the instructions may further cause determining at least a subset of the one or more vehicles as one or more eligible vehicles to be part of a v2g pool, wherein based on the determined at least a subset, the method further comprises determining for each of the one or more eligible vehicles, a time period, wherein the time period indicates amount of time and a time interval (start time and end time) that each eligible vehicle is capable of being a part of the v2g pool. In an embodiment, based on the determined time period, the instructions may further cause determining an amount of energy each of the eligible vehicle is capable of supplying.

In an embodiment, the instructions may further cause identifying for a given time period, at least a subset from the one or more cells as one of a sustainable resource or a non-sustainable resource.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

As discussed above, electric utilities have started supporting micro grids which help in improving grid resilience and in reducing peak congestion. Particularly, Vehicle-to-Grid (V2G) technologies are being adopted to reduce peak demand and to take over as energy sources during times of grid instability. It is necessary to accurately estimate the attributes of electric vehicle trips, for example, trip start/end locations, velocity/acceleration values during a trip, and the like, and the residual battery charge in order to correctly predict the spatio-temporal availability of energy from EVs to form a micro grid. However, it may not be feasible to get the required attributes for all vehicles in a city-scale traffic scenario. Embodiments of the present disclosure and system address the problem of accurately estimating the local energy reserve that is available from parked EVs during a given time of the day. In addition, the system also determines which neighborhoods have the potential to form micro grids using the parked EVs during a given time period. This will help grid operator(s) to plan and design smart grids which can create EV-powered micro grids in neighborhoods during periods of peak demand or during disruptions.

Embodiments of the present disclosure provide systems and methods that implement electric vehicle based micro grid identification for on-demand power supply on the basis of energy consumption, energy savings, charging/discharging profiles, trip information associated with the electric vehicles. More particularly, for example, when there is a power black-out, it is necessary to determine whether a EV park in a neighborhood supply energy/power, and help the neighborhood with powering electric items) with the help of in-built battery storage. Given a time period of blackout, it is important to know how many vehicles are parked and what charge levels they have and how much the vehicle is willing to give power to other vehicle or neighborhood.

To evaluate the above, embodiments of the present disclosure partition the region (or city or geography) into neighborhood(s) with close boundaries or cells (could be rigid rectangular grid, or a non-rectangular cell or basically contour around set of transformers which are in the neighborhood). This step is basically performed to trace distribution network or geographic coverage and then isolate them into cells. So each cell then basically has residents or consumers who are served by one or more transformers and utilities (electrical utilities, for example, power distribution companies, and the like) will have an average base load across the year (or seasons—summer, winter, etc.) for each of the neighborhoods and that is how the distribution networks are designed as delivered. The base load i.e., the existing power supply that is required on a 24*7 basis is determined which is usually done at every specific time interval (e.g., say every 15 minutes). Typically in mature markets where there are wholesale and retail utilities one has to place orders for demand on a 15 minutes interval.

It will be then known in a given neighborhood what the load graph looks like and then the nature or the characteristics of a neighborhood's electric vehicles are realized. This requires two things—1) to know the charge level of electric vehicle when they are parked, and 2) when they are parked (e.g., time when it was parked). The system may then compute a real world metric on the nature of vehicles or given the characteristic of trip information and the road network that are dealt upon, or the trip information is loaded on a calibrated traffic micro-simulator to generate reasonably real life values of the battery state.

The data of each vehicle is then mapped to respective cells to obtain information pertaining to at a given time 't' how many vehicles are parked where and what their charge levels are, and to further model the state of charge of the battery—when battery is charged, when it is discharged, and when there are v2g cases. This makes the system of the present disclosure a pluggable component, and an easy integration into any system(s) for studying the micro grids for various kind of v2g policies. Such policies may comprise but are not limited to, how much battery does a vehicle wants to give away, what is the power the vehicle can supply, when the vehicle can give power wherever it has parked or does the vehicle wants to give after completing all the trips. These policies are further configured in the system to determine whether a particular vehicle is eligible to be part of a v2g pool and if it is so how long can it be there and how much power it can give. Further for each time interval the power that can be supplied is computed and the battery state of every vehicle is updated (e.g., updating the battery state every second). For example, if the car is giving 3 kilo watt output so the battery states goes down in a non-linear fashion. Therefore, battery characteristics are required to stop the process once the battery state reaches certain charge level.

Considering a scenario, where there are 'n' vehicles in the neighborhood with different charge levels and they give different power level. The system then computes v2g supply. If the V2G supply is greater than or equal to the base load, the cell can be marked as micro grid for that time interval. In other words, if the V2G supply is greater than or equal to the base load, existing parked vehicles (for that time interval say, 10-15 minutes) in that cell can supply power to neighborhood in case of a blackout. This further enables the system to determine whether a particular neighborhood is sustainable or non-sustainable for a given time period during a blackout.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

Figure 1:
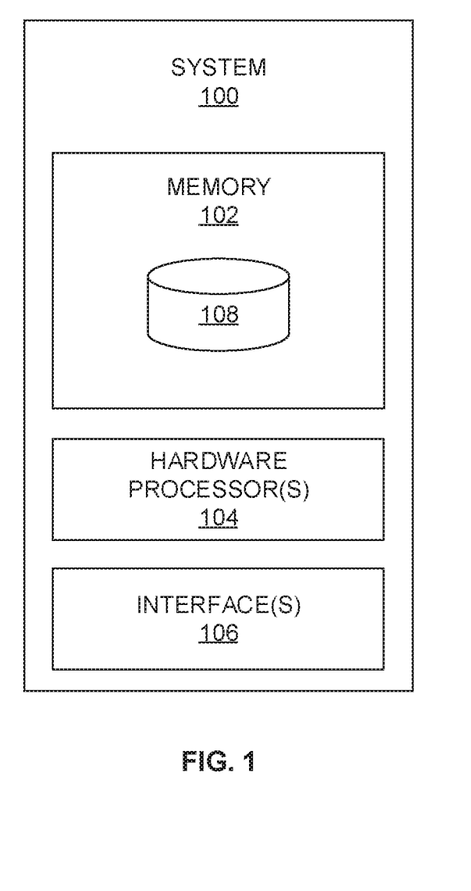
FIG. 1 illustrates an exemplary block diagram of a system for electric vehicle based micro grid identification for on-demand power supply in accordance with an embodiment of the present disclosure.

FIG. 1 illustrates an exemplary block diagram of a system 100 for electric vehicle based micro grid identification for on-demand power supply in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to information pertaining to signal(s) (e.g., trip information, state of charge of battery/vehicle, cell data, micro grid data, data pertaining to one or more utilities serving each cell, information pertaining to eligible vehicles, policy variables pertaining to each vehicle, base load data, and the like). In an embodiment, the memory 102 may store one or more calibrated traffic micro simulator(s) (not shown in FIG. 1) and the like, which are executed by the one or more hardware processors 104 (or by the system 100) to perform the methodology described herein.

Figure 2A:
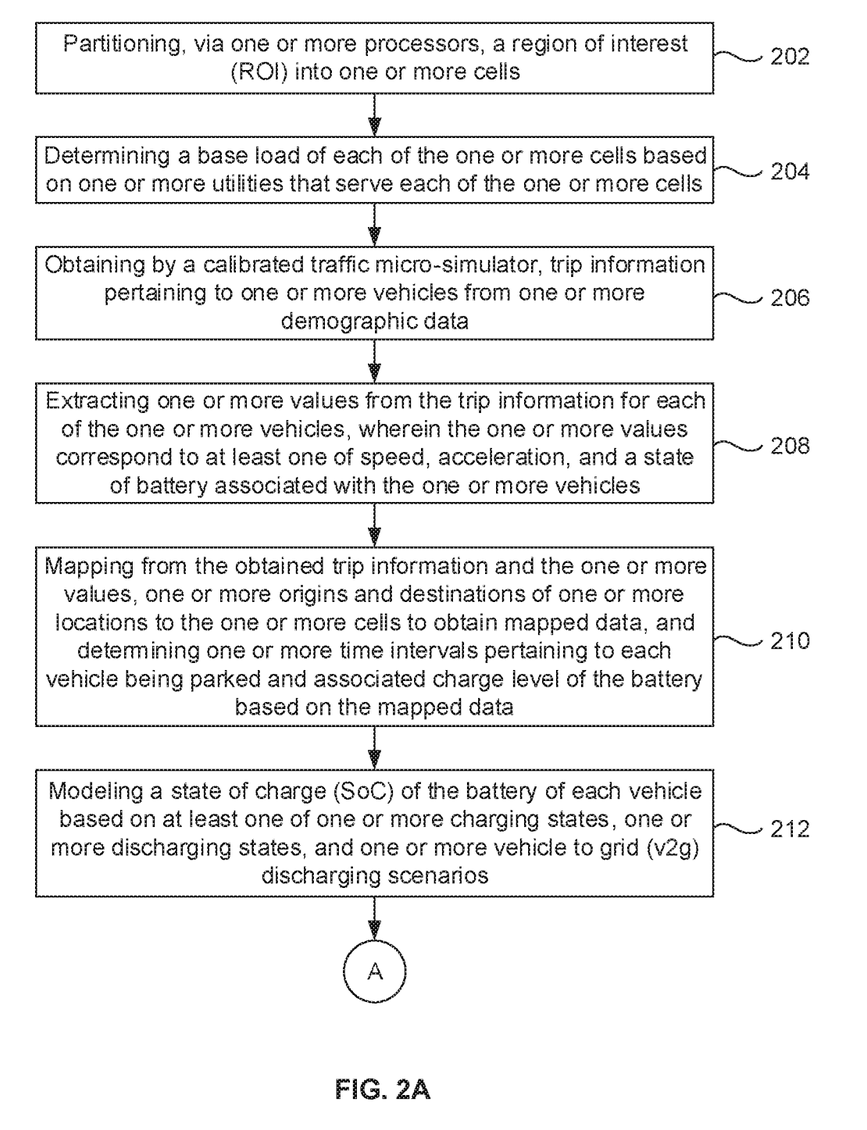
FIGS. 2A-2B illustrate an exemplary flow diagram of a method for electric vehicle based micro grid identification for on-demand power supply using a calibrated traffic micro simulator executed by the system of FIG. 1 in accordance with an embodiment of the present disclosure.
Figure 2B:
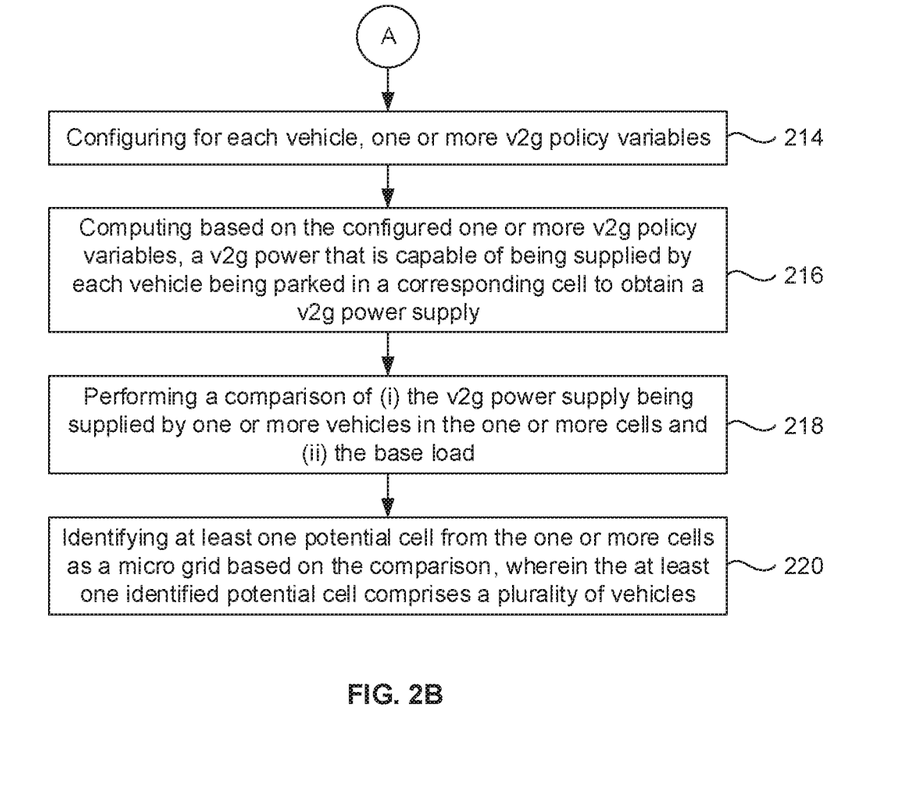

FIGS. 2A-2B, with reference to FIG. 1, illustrate an exemplary flow diagram of a method for electric vehicle based micro grid identification for on-demand power supply using a calibrated traffic micro simulator executed by the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram of FIG. 2A-2B. In an embodiment of the present disclosure, at step 202, the one or more hardware processors 104 partition a region of interest (ROI) into one or more cells (e.g., also referred hereinafter as "one or more closed boundaries"), wherein the region of interest comprises of a neighborhood. Below in Table 1 is an illustrative example that depicts information pertaining to the one or more cells being stored in the memory 102:

In Table 1:

TABLE 1

| Cell_id | Information |
| --- | --- |
| 486 | 0103000020E610000001000000050000024FFAEBBCFAE184 . . . |
| 418 | 103000020E6100000010000000500000B1C6704BCA6818 . . . |
| 45 | 0103000020E6100000010000000500000015ADD93ADB89184 . . . |
| 506 | 0103000020E61000000100000005000000C52473B0C16E1840ABB . . . |
| 488 | 0103000020E610000001000000050000000691BBE6F6BC18403C . . . |

In an embodiment of the present disclosure, at step 204, the one or more hardware processors 104 determine a base load of each of the one or more cells based on one or more utilities that serve each of the one or more cells. In an example embodiment, the one or more utilities comprise one or more power (and/or energy) distribution networks). Below in Table 2 is an illustrative example that depicts information pertaining to the base load at each of the one or more cells being stored in the memory 102:

TABLE 2

| Time | Cell_id | Base Load (Mega Watt) |
| --- | --- | --- |
| 900 | 243 | 0.1436613247 |
| 900 | 304 | 0.3050343195 |
| 1800 | 243 | 0.1436613247 |
| 4500 | 243 | 0.1339688796 |
| 4500 | 304 | 0.284454470 |

In an embodiment of the present disclosure, at step 206, the one or more hardware processors 104 obtain by using a calibrated traffic micro-simulator, trip information pertaining to one or more vehicles (also referred as electric vehicle or smart electric vehicle or SEV hereinafter) Below in Table 3 is an illustrative example that depicts trip information pertaining to each vehicle being stored in the memory 102:

TABLE 3

| Vehicle ID | Origin | Origin Cell ID | Destination Designation | Destination Cell ID | Parked Cell ID | Time Start | Time End |
| --- | --- | --- | --- | --- | --- | --- | --- |
| h62369 c1 | 6.125089, 49.620898 | 479 | 6.046882, 49.613339 | 439 | 439 | 29599 | 30646 |
| h62369 c1 | 6.046818, 49.61356 | 439 | 6.12486, 49.621256 | 479 | 479 | 62362 | 63291 |
| h66956 c1 | 6.129521, 49.618143 | 451 | 6.162514, 49.56424 | 107 | 107 | 23405 | 24388 |

TABLE 3-continued

| Vehicle ID | Origin Origin | Origin Cell ID | Designation | Destination Cell ID | Parked Cell ID | Time Start | End |
|---|---|---|---|---|---|---|---|
| h66956c1 | 6.162114, 49.564699 | 107 | 6.1295, 49.618327 | 451 | 451 | 60216 | 61250 |

In an embodiment of the present disclosure, at step 208, the one or more hardware processors 104 extract one or more values from the trip information for each of the one or more vehicles, wherein the one or more values correspond to at least one of speed, acceleration associated with the one or more vehicles. Below in Table 4 is an illustrative example that depicts values pertaining to each vehicle being stored in the memory 102:

TABLE 4

| Vehicle ID:Trip | Time | Speed | Acceleration |
|---|---|---|---|
| h66956c1:1 | 23405 | 0 | 1.50643 |
| h66956c1:1 | 23406 | 1.50643 | 1.97434 |
| h66956c1:1 | 23407 | 3.48077 | 1.40478 |
| h66956c1:3 | 60217 | 0 | 1.60907 |
| h66956c1:3 | 60218 | 1.60907 | 1.68896 |
| h66956c1:3 | 60219 | 3.29804 | 1.70873 |
| h62369c1:1 | 29599 | 0 | 2.03697 |
| h62369c1:1 | 29600 | 2.03697 | 1.65793 |
| h62369c1:1 | 29601 | 3.6949 | 1.70779 |
| h62369c1:3 | 62362 | 0 | 2.01156 |
| h62369c1:3 | 62363 | 2.01156 | 1.45579 |
| h62369c1:3 | 62364 | 3.46735 | 1.46719 |

The speed and acceleration values if not available, are generated by feeding the trip data to the calibrated traffic micro simulator, in one example embodiment. In an embodiment of the present disclosure, at step 210, the one or more hardware processors 104 maps, from the obtained trip information and the one or more values, one or more origins and destinations of one or more locations to the one or more cells to obtain mapped data, and further determines one or more time intervals pertaining to each vehicle being parked and associated charge level of battery of each vehicle based on the mapped data. In an example embodiment, each of the one or more origins and destinations of the one or more locations is mapped to a corresponding cell in which each vehicle is located.

In an embodiment of the present disclosure, at step 212, the one or more hardware processors 104 model a state of charge (SoC) of the battery of each vehicle based on at least one of one or more charging states, one or more discharging states, and one or more vehicle to grid (v2g) discharging scenarios. In an example embodiment, the State of Charge (SoC) of the battery at a time instance 't' is modeled for the following cases:
1. Driving—discharging
2. Driving—recharging due to regeneration The closed form or a numerical approximation of the above 2 cases is represented by way of below illustrative expression:

$$soc(t+\Delta t)=f(soc(t),v(t),a(t)) \quad (1)$$

Charging Via Wall Socket:
The closed form or a numerical approximation of the above 2 cases is represented by way of below illustrative expression:

$$soc(t+\Delta t)=f(soc(t),\text{power}_{charge}(t)) \quad (2)$$

Vehicle to Grid (v2g/V2G) Discharging to the Grid:
The closed form or a numerical approximation of the above 2 cases is represented by way of below illustrative expression:

$$soc(t+\Delta t)=f(soc(t),\text{power}_{v2g}(t)) \quad (3)$$

In an embodiment of the present disclosure, at step 214, the one or more hardware processors 104 configure, for each vehicle, one or more v2g policy variables. In an example embodiment, the v2g policy variables comprise but are not limited to, at least one of an amount of energy to be supplied by a vehicle based on a battery energy threshold, an amount of power a vehicle is capable of supplying, time (e.g., at what time, and for how much time) at which a vehicle is capable of supplying power when the vehicle is in the one or more cells. In other words, the v2g policy variables comprise a maximum SoC level below which v2g is cut-off—(value from 0 to 1), a maximum v2g power supplied—(in Watts), an availability for V2G—for example anytime when it is parked) or only at the end of all trips for a particular day.

In an embodiment of the present disclosure, at step 216, the one or more hardware processors 104 computing based on the configured one or more v2g policy variables, a v2g power that is capable of being supplied by each vehicle being parked in a corresponding cell to obtain a v2g power supply. In other words, for a given time interval, V2G discharge for the qualified vehicles (e.g., one or more eligible vehicles) using a V2G discharge function. Below is in Table 5 an illustrative example of constant power discharge and tracking of the battery SoC:

TABLE 5

| Time | Vehicle ID | V2G Power | SoC |
|---|---|---|---|
| 79003 | h66956c1 | 3300 | 0.9290329 |
| 79199 | h66956c1 | 3300 | 0.926962 |
| 70836 | h62369c1 | 3300 | 0.9186414 |
| 71117 | h62369c1 | 3300 | 0.934694 |

In an embodiment of the present disclosure, at step 218, the one or more hardware processors 104 perform a comparison of (i) the v2g power supply being supplied by one or more vehicles in the one or more cells and (ii) the base load. In an embodiment of the present disclosure, at step 220, the one or more hardware processors 104 identify at least one potential cell from the one or more cells as a micro grid based on the comparison, wherein the at least one identified potential cell comprises a plurality of vehicles. In other words, the total V2G power supplied (or to be supplied) by qualified/eligible vehicle is computed for a given Cell ID and compared with the base load. In an example embodiment, the at least one potential cell is identified as the micro grid when the v2g power supply is greater than the base load. For example, if the V2G power supply (or supplied) is greater than or equal to the base load for a given time interval, identified cell(s) is/are marked as a micro grid.

Below in Table 6 is an illustrative of such a computation provided by way of example:

TABLE 6

| Time | Cell ID | Base Load(MW) | V2G Power(MW) |
|------|---------|---------------|---------------|
| 900  | 243     | 0.1436613247  | 0.1584        |
| 900  | 304     | 0.3050343195  | 0.3696        |
| 1800 | 243     | 0.1436613247  | 0.1584        |
| 4500 | 243     | 0.1339688796  | 0.1584        |
| 4500 | 304     | 0.2844544704  | 0.3696        |

Upon the v2g power being supplied by each vehicle, the SoC of the battery of each vehicle that has contributed the v2g power is updated. Based on one or more patterns of charging, discharging states of each vehicle, at least a subset of the one or more vehicles are determined as one or more eligible vehicles to be part of a v2g pool. Based on the subset being determined, determining for each vehicle from the subset, a time period, wherein the time period indicates an amount of time and a time interval (e.g., start time and end time) that each eligible vehicle is capable of being a part of the v2g pool. Once the time period is determined, an amount of energy that each of the eligible vehicle is capable of supplying is determined. In one example embodiment, the amount of energy is based on rate of energy/power supply and current SoC level of the battery with respect to a battery level threshold. Further based on one or more patterns (or historical data) pertaining to charging and discharging capabilities (or power or energy being supplied by) of each of the one or more vehicle(s) (e.g., eligible vehicles and non-eligible vehicles), the system 100 further identifies, for a given time period, at least a subset from the one or more cells as one of a sustainable resource or a non-sustainable resource. Sustainable resources are cells that are capable of supplying the v2g power supply and non-sustainable resources are cells that are not capable of supplying the v2g power supply. In other words, based on the historical data and the charging and discharging patterns (including trip information), one or more cells may be identified as at least one of sustainable resource or a non-sustainable resource.

Figure 3:
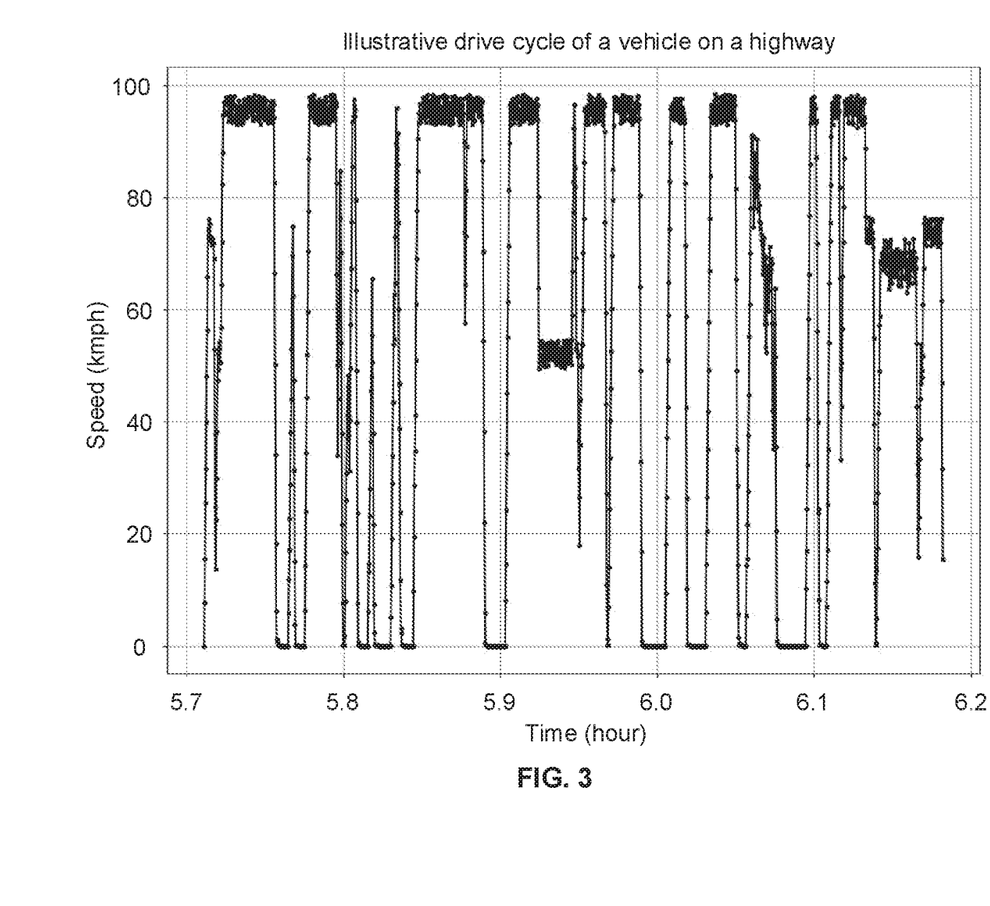
FIG. 3 illustrates a graphical representation of time versus speed associated with one or more electric vehicles for a given time interval in accordance with an example embodiment of the present disclosure.

FIG. 3, with reference to FIGS. 1-2B, illustrates a graphical representation of time versus speed associated with one or more electric vehicles for a given time interval in accordance with an example embodiment of the present disclosure. More particularly, FIG. 3 illustrates time versus speed characteristics depicting drive profile of a vehicle on a highway as simulated by the calibrated traffic micro simulator of the system 100 of FIG. 1. In other words, FIG. 3 depicts the drive cycle of a vehicle (e.g., a car) going on a highway. In an example embodiment, the vehicle accelerates, decelerates and stops based on the traffic conditions like vehicles ahead of it, traffic lights, etc. During deceleration energy is captured back to the battery via regeneration.

Figure 4:
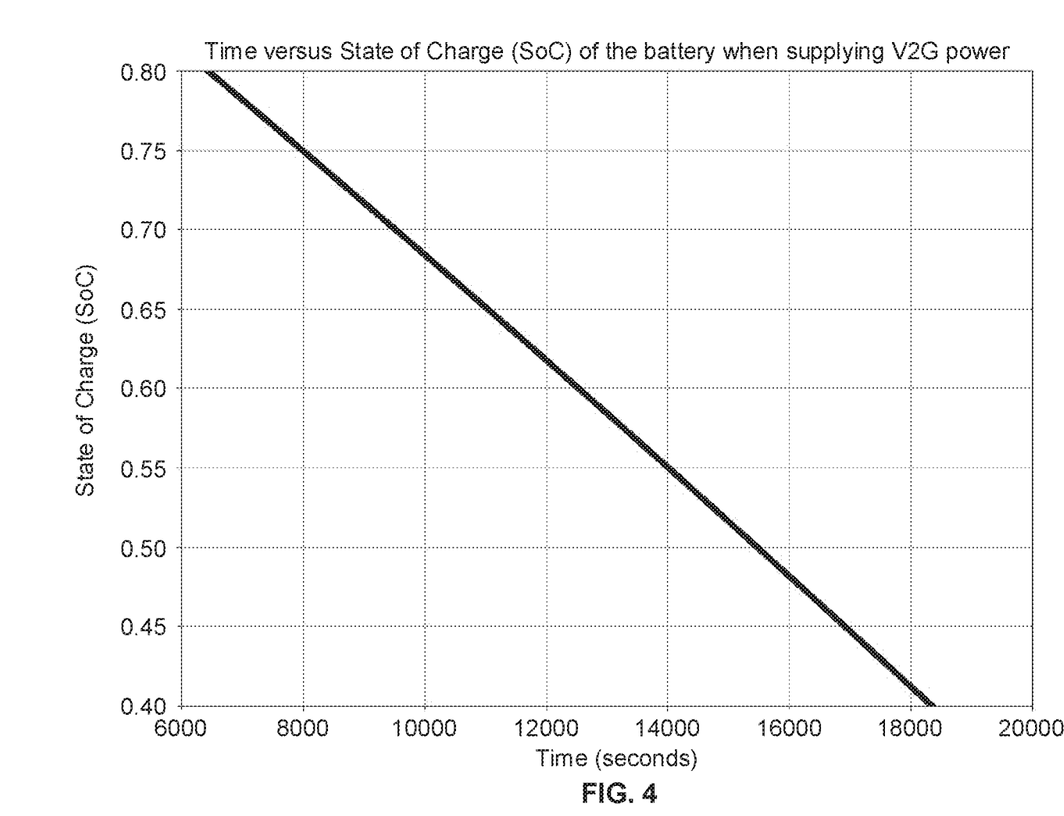
FIG. 4 illustrates a graphical representation of time versus state of charge (SoC) of battery associated with one or more electric vehicles for a given time interval in accordance with an example embodiment of the present disclosure.

FIG. 4, with reference to FIGS. 1 through 3, illustrates a graphical representation of time versus state of charge (SoC) of battery associated with one or more electric vehicles for a given time interval in accordance with an example embodiment of the present disclosure. More particularly, FIG. 4 illustrates time versus SoC characteristics depicting the state of charge of battery when it provides v2g power. In other words, FIG. 4 depicts the State of Charge of the battery pack of an electric vehicle when it supplies power via V2G. The power supplied is constant and it stops when the vehicle has to start a trip or it has reached a threshold SoC.

Figure 5:
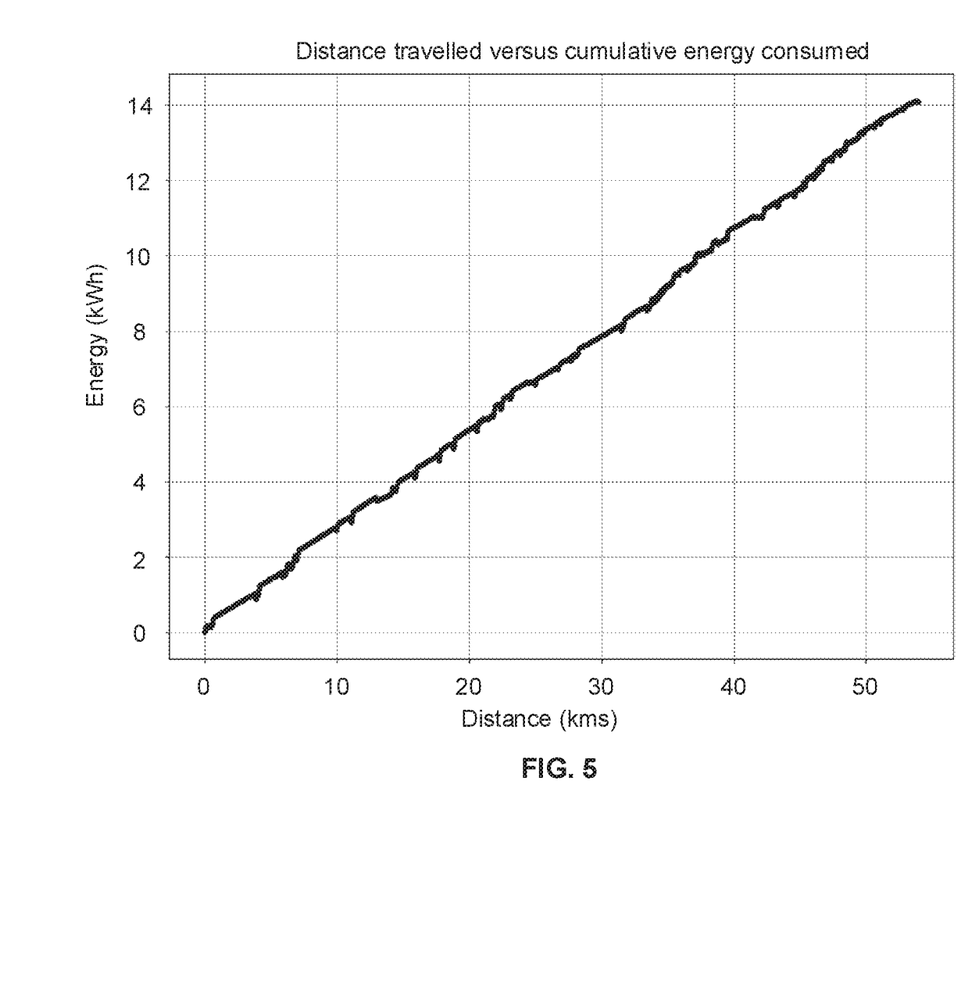
FIG. 5 illustrates a graphical representation of distance travelled versus cumulative energy consumed for a given time interval in accordance with an example embodiment of the present disclosure.

FIG. 5, with reference to FIGS. 1 through 4, illustrates a graphical representation of distance travelled versus cumulative energy consumed for a given time interval in accordance with an example embodiment of the present disclosure. More particularly, FIG. 5 illustrates cumulative energy consumed by the vehicle as a function of distance travelled. In other words, FIG. 5 depicts the cumulative energy used by the battery during a drive cycle. The graph shows dips (or decrease in SoC) in various time periods. In an example embodiment, these dips may be (or are) due to energy put back in the battery during regenerative braking.

Unlike traditional systems and methods wherein there may be inaccuracies in estimating attributes of EVs for power supply, embodiments of the present disclosure implement systems and methods that make use of the fine-grained vehicle movement characteristics (i.e., per-second velocity and acceleration values) to more accurately track and predict the state of charge of the EV battery. Further, traditional systems and methods assumes average values of velocity/acceleration to profile the charge/discharge behaviour, which may be inaccurate as the charging/discharging behaviour is path-dependent, i.e., all the intermediate values of velocity/acceleration (as opposed to just average or end-values) are required to capture the behaviour accurately. Unlike traditional systems that do not take into account the demand at a local (spatio-temporal) scale, but only at the aggregate, temporal scale, system of the present disclosure uses aggregated trip information for the entire city-scale vehicular traffic, in conjunction with the policies adopted by the EV owners, to estimate the potential for creation of EV-powered micro grids in neighborhoods. Further, the system 100 is configured to utilize all the intermediate velocity and acceleration values to compute the charge/discharge. The system 100 further models all the trips more accurately to enable tracking of the locations and times where and when trips originate and end, thereby being able to determine the locations and times when EVs can participate in micro grid formation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:

partitioning, via one or more processors, a geographic region of interest (ROI) into one or more cells with a closed boundary contour around a set of transformers in a neighborhood, wherein each cell includes consumers being served by the transformer and one or more electrical utilities;

determining a base load of each of the one or more cells served by one or more electrical utilities, wherein the base load corresponds to existing power supply determined at every specific time interval of 15 minutes for each of the cells;

obtaining by a calibrated traffic micro-simulator, trip information, for entire city-scale vehicular traffic, pertaining to one or more vehicles;

extracting values from the trip information for each of the one or more vehicles, wherein the extracted values correspond to a fine-grained vehicle movement of speed and acceleration, extracted per every second, when the speed and acceleration are not available then the speed and acceleration are generated by feeding the trip information to the calibrated traffic micro-simulator, and wherein the extracted values of speed and acceleration are used to predict a state of battery associated with the one or more vehicles per every second;

mapping locations of origin and destination of each vehicle to the one or more cells to obtain mapped data, wherein mapping is performed based on the trip information, wherein each of the origin and destination corresponds to a cell in which trip of each vehicle starts or ends;

determining at a time interval of 10 to 15 minutes, based on both the mapped data and the state of battery, a parking time of each vehicle in particular cell and a charge level of the battery;

modeling a state of charge (SoC) of the battery of each vehicle based on at least one of one or more charging states, one or more discharging states, and one or more vehicle to grid (v2g) discharging scenarios, wherein both the charging states and the discharging states are based on the extracted values, wherein the SoC of the battery at a time instance 't' is modeled for (1) driving-discharging and (2) driving-recharging due to regeneration, and represented as:

$$soc(t+\Delta t)=f(soc(t),v(t),a(t)),$$

wherein v(t) is velocity, a(t) is acceleration, wherein the SoC for charging with a wall socket for (1) and (2) is represented as:

$$soc(t+\Delta t)=f(soc(t),\text{power}_{charge}(t)),$$

and the SoC for vehicle to Grid (v2g) discharging to the grid for (1) and (2) is represented as:

$$soc(t+\Delta t)=f(soc(t),\text{power}_{v2g}(t));$$

configuring for each vehicle, one or more v2g policy variables that determines eligibility of the vehicle to be part of a v2g pool, wherein the one or more v2g policy variables are configured based on the SoC, and wherein the one or more v2g policy variables comprises at least one of an amount of energy to be supplied by each vehicle based on a battery energy threshold, an amount of power each vehicle is capable of supplying, a time at which each vehicle is capable of supplying power when the vehicle is in the one or more cells, wherein the one or more v2g policy variables includes a maximum SoC level below which v2g is cut-off with value from 0 to 1, a maximum v2g power supplied in watts, an availability of v2g when the vehicle is parked or only at the end of all trips for a particular day;

computing based on the configured one or more v2g policy variables, a v2g power that is capable of being supplied by each vehicle being parked in a corresponding cell to obtain a v2g power supply, wherein, for a given time interval, battery SoC is tracked with constant v2g power discharge for the vehicles;
performing a comparison of (i) the v2g power supply being supplied by one or more vehicles in the one or more cells and (ii) the base load; and
identifying at least one potential cell from the one or more cells as a micro grid based on the comparison, wherein the at least one identified potential cell comprises a plurality of vehicles that supplies v2g power, wherein the at least one potential cell is identified by computing a total v2g power supplied by the vehicle for the cell and comparing with the base load.

2. The processor implemented method of claim 1, further comprising updating a state of charge (SoC) of the battery of each vehicle that has contributed the v2g power.

3. The processor implemented method of claim 1, wherein the at least one cell is identified as the micro grid when the v2g power supply is greater than the base load.

4. The processor implemented method of claim 1, further comprising determining for each of the one or more eligible vehicles, a time period, wherein the time period indicates an amount of time and a time interval that each eligible vehicle is capable of being a part of the v2g pool.

5. The processor implemented method of claim 4, further comprising based on the determined time period, determining an amount of energy each of the eligible vehicle is capable of supplying.

6. The processor implemented method of claim 1, further comprising identifying for a given time period, at least a subset from the one or more cells as one of a sustainable resource or a non-sustainable resource.

7. A system (100) comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
partition a geographic region of interest (ROI) into one or more cells with a closed boundary contour around a set of transformers in a neighborhood, wherein each cell includes consumers being served by the transformer and one or more electrical utilities;
determine a base load of each of the one or more cells served by one or more electrical utilities, wherein the base load corresponds to existing power supply determined at every specific time interval of 15 minutes for each of the cells;
obtain via a calibrated traffic micro-simulator, trip information, for entire city-scale vehicular traffic, pertaining to one or more vehicles;
extract values from the trip information for each of the one or more vehicles, wherein the extracted values correspond to a fine-grained vehicle movement of speed and acceleration, extracted per every second, when the speed and acceleration are not available then the speed and acceleration are generated by feeding the trip information to the calibrated traffic micro-simulator, and wherein the extracted values of speed and acceleration are used to predict a state of battery associated with the one or more vehicles per every second;
map locations of origin and destination of each vehicle to the one or more cells to obtain mapped data, wherein mapping is performed based on the trip information, wherein each of the origin and destination corresponds to a cell in which trip of each vehicle starts or ends;
determine at a time interval of 10 to 15 minutes, based on both the mapped data and the state of battery, a parking time of each vehicle in particular cell and a charge level of the battery;
model a state of charge (SoC) of the battery of each vehicle based on at least one of one or more charging states, one or more discharging states, and one or more vehicle to grid (v2g) discharging scenarios, wherein both the charging states and the discharging states are based on the extracted values, wherein the SoC of the battery at a time instance T is modeled for (1) driving-discharging and (2) driving-recharging due to regeneration, and represented as:

$$soc(t+\Delta t)=f(soc(t),v(t),a(t)),$$

wherein v(t) is velocity, a(t) is acceleration, wherein the SoC for charging with a wall socket for (1) and (2) is represented as:

$$soc(t+\Delta t)=f(soc(t),power_{charge}(t)),$$

and the SoC for vehicle to Grid (v2g) discharging to the grid for (1) and (2) is represented as:

$$soc(t+\Delta t)=f(soc(t),power_{v2g}(t));$$

configure for each vehicle, one or more v2g policy variables that determines eligibility of the vehicle to be part of a v2g pool, wherein the one or more v2g policy variables are configured based on the SoC, and wherein the one or more v2g policy variables comprises at least one of an amount of energy to be supplied by each vehicle based on a battery energy threshold, an amount of power each vehicle is capable of supplying, a time at which each vehicle is capable of supplying power when the vehicle is in the one or more cells, wherein the one or more v2g policy variables includes a maximum SoC level below which v2g is cut-off with value from 0 to 1, a maximum v2g power supplied in watts, an availability of v2g when the vehicle is parked or only at the end of all trips for a particular day;
compute based on the configured one or more v2g policy variables, a v2g power that is capable of being supplied by each vehicle being parked in a corresponding cell to obtain a v2g power supply, wherein, for a given time interval, battery SoC is tracked with constant v2g power discharge for the vehicles;
perform a comparison of (i) the v2g power supply being supplied by one or more vehicles in the one or more cells and (ii) the base load; and
identify at least one potential cell from the one or more cells as a micro grid based on the comparison, wherein the at least one identified potential cell comprises a plurality of vehicles that supplies v2g power, wherein the at least one potential cell is identified by computing a total v2g power supplied by the vehicle for the cell and comparing with the base load.

8. The system of claim 7, wherein the one or more hardware processors (104) are further configured by instructions to update a state of charge (SoC) of the battery of each vehicle that has contributed the v2g power.

9. The system of claim 7, wherein the at least one cell is identified as the micro grid when the v2g power supply is greater than the base load.

10. The system of claim 7, wherein the one or more hardware processors (104) are further configured by instructions to determine, for each of the one or more eligible vehicles, a time period, wherein the time period indicates amount of time and a time interval that each eligible vehicle is capable of being a part of the v2g pool.

11. The system of claim 10, based on the determined time period, the one or more hardware processors (104) are further configured by instructions to determine an amount of energy each of the eligible vehicle is capable of supplying.

12. The system of claim 7, wherein the one or more hardware processors (104) are further configured by instructions to identify for a given time period, at least a subset from the one or more cells as one of a sustainable resource or a non-sustainable resource.

13. One or more non-transitory computer readable information storage mediums comprising one or more instructions which when executed by one or more hardware processors causes:

partitioning, via the one or more hardware processors, a geographic region of interest (ROI) into one or more cells with a closed boundary contour around a set of transformers in a neighborhood, wherein each cell includes consumers being served by the transformer and one or more electrical utilities;

determining a base load of each of the one or more cells served by one or more electrical utilities, wherein the base load corresponds to existing power supply determined at every specific time interval of 15 minutes for each of the cells;

obtaining by a calibrated traffic micro-simulator, trip information, for entire city-scale vehicular traffic, pertaining to one or more vehicles;

extracting values from the trip information for each of the one or more vehicles, wherein the extracted values correspond to a fine-grained vehicle movement of speed and acceleration, extracted per every second, when the speed and acceleration are not available then the speed and acceleration are generated by feeding the trip information to the calibrated traffic micro-simulator, and wherein the extracted values of speed and acceleration are used to predict a state of battery associated with the one or more vehicles per every second;

mapping locations of origin and destination of each vehicle to the one or more cells to obtain mapped data, wherein mapping is performed based on the trip information, wherein each of the origin and destination corresponds to a cell in which trip of each vehicle starts or ends;

determining at a time interval of 10 to 15 minutes, based on both the mapped data and the state of battery, a parking time of each vehicle in particular cell and a charge level of the battery;

modeling a state of charge (SoC) of the battery of each vehicle based on at least one of one or more charging states, one or more discharging states, and one or more vehicle to grid (v2g) discharging scenarios, wherein both the charging states and the discharging states are based on the extracted values, wherein the SoC of the battery at a time instance T is modeled for (1) driving-discharging and (2) driving-recharging due to regeneration, and represented as:

$soc(t+\Delta t)=f(soc(t),v(t),a(t))$, wherein v(t) is velocity, a(t) is acceleration, wherein the SoC for charging with a wall socket for (1) and (2) is represented as:

$soc(t+\Delta t)=f(soc(t),power_{charge}(t))$, and the SoC for vehicle to Grid (v2g) discharging to the grid for (1) and (2) is represented as:

$soc(t+\Delta t)=f(soc(t),power_{v2g}(t))$;

configuring for each vehicle, one or more v2g policy variables that determines eligibility of the vehicle to be part of a v2g pool, wherein the one or more v2g policy variables are configured based on the SoC, and wherein the one or more v2g policy variables comprises at least one of an amount of energy to be supplied by each vehicle based on a battery energy threshold, an amount of power each vehicle is capable of supplying, a time at which each vehicle is capable of supplying power when the vehicle is in the one or more cells, wherein the one or more v2g policy variables includes a maximum SoC level below which v2g is cut-off with value from 0 to 1, a maximum v2g power supplied in watts, an availability of v2g when the vehicle is parked or only at the end of all trips for a particular day;

computing based on the configured one or more v2g policy variables, a v2g power that is capable of being supplied by each vehicle being parked in a corresponding cell to obtain a v2g power supply, wherein, for a given time interval, battery SoC is tracked with constant v2g power discharge for the vehicles;

performing a comparison of (i) the v2g power supply being supplied by one or more vehicles in the one or more cells and (ii) the base load; and identifying at least one potential cell from the one or more cells as a micro grid based on the comparison, wherein the at least one identified potential cell comprises a plurality of vehicles that supplies v2g power, wherein the at least one potential cell is identified by computing a total v2g power supplied by the vehicle for the cell and comparing with the base load.

14. The one or more non-transitory computer readable information storage mediums of claim 13, wherein the instructions which when executed by the one or more hardware processors further cause updating a state of charge (SoC) of the battery of each vehicle that has contributed the v2g power.

15. The one or more non-transitory computer readable information storage mediums of claim 13, wherein the instructions which when executed by the one or more hardware processors further cause determining for each of the one or more eligible vehicles, a time period, wherein the time period indicates an amount of time and a time interval that each eligible vehicle is capable of being a part of the v2g pool; and based on the determined time period, determining an amount of energy each of the eligible vehicle is capable of supplying.

16. The one or more non-transitory computer readable information storage mediums of claim 13, wherein the instructions which when executed by the one or more hardware processors further cause, identifying for a given time period, at least a subset from the one or more cells as one of a sustainable resource or a non-sustainable resource.

* * * * *